United States Patent [19]
Breidenbach

[11] Patent Number: 5,322,738
[45] Date of Patent: Jun. 21, 1994

[54] CLAY BUILDING BOARD AND PROCESS FOR PRODUCING IT

[76] Inventor: Peter Breidenbach, Nettetaler Str. 106, D-4060 Viersen-Boisheim, Fed. Rep. of Germany

[21] Appl. No.: 952,710
[22] PCT Filed: May 27, 1991
[86] PCT No.: PCT/DE91/00441
  § 371 Date: Nov. 25, 1992
  § 102(e) Date: Nov. 25, 1992
[87] PCT Pub. No.: WO91/19058
  PCT Pub. Date: Dec. 12, 1991

[30] Foreign Application Priority Data
May 26, 1990 [DE] Fed. Rep. of Germany ....... 4017057

[51] Int. Cl.⁵ .............................................. B32B 13/02
[52] U.S. Cl. ..................... 428/532; 156/142; 264/333; 428/703
[58] Field of Search .................. 156/42; 264/257, 333; 428/532, 703

[56] References Cited

U.S. PATENT DOCUMENTS

| | | | |
|---|---|---|---|
| 1,604,236 | 2/1925 | Peters . | |
| 4,302,722 | 12/1981 | Pilgrim | 428/703 |
| 4,351,867 | 9/1982 | Mulvey et al. | 428/703 |
| 4,414,262 | 11/1983 | Hartmann et al. | 428/703 |
| 4,504,335 | 3/1985 | Galer | 428/703 |
| 4,551,384 | 11/1985 | Aston et al. | 428/312.6 |
| 4,617,219 | 10/1986 | Schumpack | 428/703 |
| 4,619,857 | 10/1986 | Gmur | 428/703 |
| 4,769,266 | 9/1988 | Lerner et al. | 428/703 |
| 4,810,569 | 3/1989 | Lehmert et al. | 428/703 |
| 4,868,039 | 9/1989 | Lehan | 428/703 |
| 4,879,173 | 11/1989 | Randall | 428/703 |
| 4,916,004 | 4/1990 | Ensminger et al. | 428/703 |
| 4,948,647 | 8/1990 | Burkard | 428/703 |
| 5,116,671 | 5/1992 | Bruce et al. | 428/703 |

FOREIGN PATENT DOCUMENTS

| | | |
|---|---|---|
| 0128681 | 12/1984 | European Pat. Off. . |
| 0258734 | 3/1988 | European Pat. Off. . |
| 1813733 | 6/1970 | Fed. Rep. of Germany . |
| 1148143 | 12/1957 | France . |
| 1534389 | 7/1968 | France . |
| 2298658 | 8/1976 | France . |
| 2580627 | 10/1986 | France . |
| 0163458 | 10/1933 | Switzerland . |
| 2016367 | 9/1979 | United Kingdom . |
| 2225599 | 6/1990 | United Kingdom . |
| 8704976 | 8/1987 | World Int. Prop. O. . |

OTHER PUBLICATIONS

Luasanne C. H., "Lightweight Building Panel Made of Phenolic and Foamed Clay", Modern Plastics, vol. 42, No. 6, Feb. 1965, p. 46.

Primary Examiner—James C. Cannon
Attorney, Agent, or Firm—Eckert Seamans Cherin & Mellott

[57] ABSTRACT

The clay tile proposed consists of a clay-bound core layer (20) with, on each side of it, a surface layer (22,24) of netlike tear-resistant textile material which is at least partially embedded in the clay of the core layer (20).

17 Claims, 2 Drawing Sheets

CLAY BUILDING BOARD AND PROCESS FOR PRODUCING IT

The invention pertains to a clay building board consisting of a clay-bound core layer covered on both sides with a surface layer as well as a process for producing a clay building board of this type.

The building material clay has decisive advantages over conventional, industrialized building materials. It has the ability to regulate air humidity in rooms and thus to create a healthy living environment. However, compared to conventional, industrialized building materials, the use of clay building materials generally involves a greater amount of labor. One of the decisive advantages of clay construction, namely, inexpensive starting materials, is thus offset by the greater processing time. To counteract this problem, attempts have already been made to shift as many activities as possible away from the construction site and towards industrial or semi-industrial prefabrication.

EP-A-128 681 describes a clay building board of the type specified above. Its clay-bound core layer contains expandable minerals and reinforcement in the form of fibers. The core layer is covered on both sides with a surface layer made of paper.

The invention pertains to boardlike finished parts of this type that use clay as the binder. The term "clay building board" is defined as a clay finished part shaped in the form of a board. Clays that can be used include especially light clay and in this category especially straw light clay or clay with porous mineral additives. The term "board" is defined here as a member with essentially flat main surfaces, whose dimensions in length and width are essentially arbitrary, but in any case can be several meters, and whose thickness can vary between a few centimeters and a few decimeters.

WO 87/04976 describes a cement-bound building board, which is reinforced by a network of glass fibers, which is embedded near the surface. DE-A-18 13 733 concerns a very generally described, hydraulically bound building board, which is reinforced by a netlike plastic material, which is either embedded entirely near the surface or merely rests on the surface. U.S. Pat. No. 1,604,236 describes a cement-bound building board, in which a net is embedded near one of the main surfaces. It is intended to prevent coarse fiber components of the still plastic core material from being able to adhere to the pressing rolls during the production process.

The goal of the invention is to develop a clay building board of the type specified, and a process for producing it. It should be possible to produce the clay building board industrially in any desired dimensions. It should be stable and easy to handle. In particular, is should be easy to transport and easy to cut. In addition, it should have a sufficiently firm surface.

The goal of the invention is achieved by a clay building board with the features specified in the claims.

Clay building boards of this type can be industrially produced in any desired size. Due to the surface layers on both sides, they have excellent strength. They can be cut to any desired size by simple means, e.g., a hand saw or a power saw. The netlike material and the clay in the core layer are joined by superficially embedding the textile material in the clay of the core material. This results in an interlocking connection. Special additional binders are not needed. The material is embedded only so deep that the netlike structure of the textile material determines the surface of the clay building board, i.e., it is immediately recognizable from the outside. The superficially visible textile layer gives the clay building board a basically regular, relief-like structure, and, for example, when used for interior walls, the clay building board can be directly painted without any need to first apply plaster or wallpaper. This represents a significant processing simplification.

The clay building board is produced from natural materials. The textile material is especially fabric, specifically, coarse fabric made from flax, cotton and similar, naturally growing fibers. The textile layer must have a netlike structure, so that during the production of the clay building board, it can be surrounded by the wet clay, i.e., that it can be pressed at least partially into the wet clay. In this process, the clay surrounds the threads of the textile material in at least some places, with the result that the textile material becomes intimately joined with the clay. To allow this surrounding process to take place, the surface of the core layer consists essentially of clay, so that there is no obstacle to pressing the textile material into the wet clay and thus embedding it in the clay.

The core layer can be reinforced by naturally renewable materials, and its thermal properties may also be improved by these materials. Possible reinforcing materials are straw in long or short fibers, coconut, sisal, hemp, flax and the like. Reed mats have been found to be especially effective. They provide both reinforcement and thermal insulation.

In an especially preferred design, the layer of clay extends continuously from one surface of the clay building board to the other surface, at least in some areas of the board. In other words, the layer of clay is not interrupted by any intervening layers. In this case, the capillarity is maintained, and the clay building board allows water to pass through. If, on the other hand, the layers of clay in the core layer are separated from each other, e.g., by a layer of reeds arranged very tightly side by side without intervening spaces, then there is no longer any capillarity. This can be used for purposes in which the passage of water through the board is undesirable.

The diameter of its threads is smaller than the free space between two neighboring threads by a factor of five. Preferably, the free space is greater than the diameter of the threads by a factor of ten.

The threads of the textile material should be sufficiently tear-resistant that they give the clay building board the strength necessary for processing and use in the building. Standard commercial jute fabrics, for example, the product H155 made by Biederlack, have been found to have the necessary strength.

In the production of the building board by the process of the invention, it has been found to be especially advantageous if the clay is pumpable. In this case, the production of the building boards can be automated by simple means. Basically, however, it is also possible to produce clay building boards from clay mixtures which themselves are not pumpable, because, for example, they are mixed with straw or the like. An especially suitable material for the core layer is light clay, e.g., straw light clay or clay with porous mineral additives, such as expanded clay, expanded glass, expanded lava, expanded perlite or pumice.

Additional advantages and features of the invention are apparent from the other claims and from the following description of several preferred embodiments of the invention, which are explained in detail below with reference to the drawings.

Figure 1:
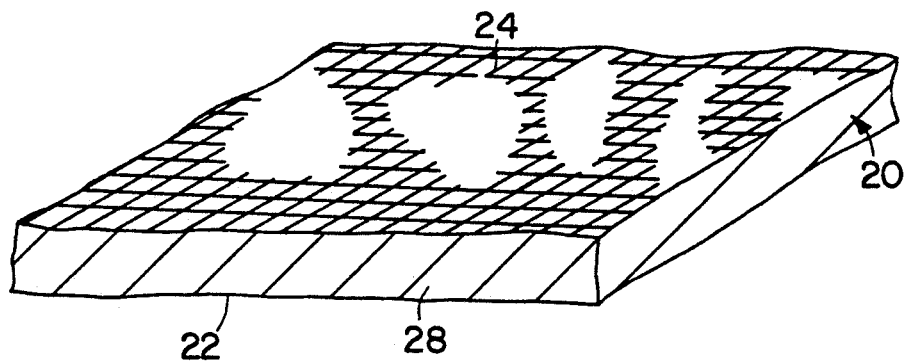
FIG. 1 shows a perspective view of a piece cut out of a clay building board.

FIG. 1 shows the clay building board in its simplest form. It consists of a core layer 20 and layers 22, 24 embedded in the two surfaces of the core layer. In this case, the core layer consists exclusively of clay, and the two layers 22, 24 consist of a netlike, tear-resistant, textile material. The plate is 16 mm thick and is worked more or less the same as gypsum plaster board.

Figure 2:
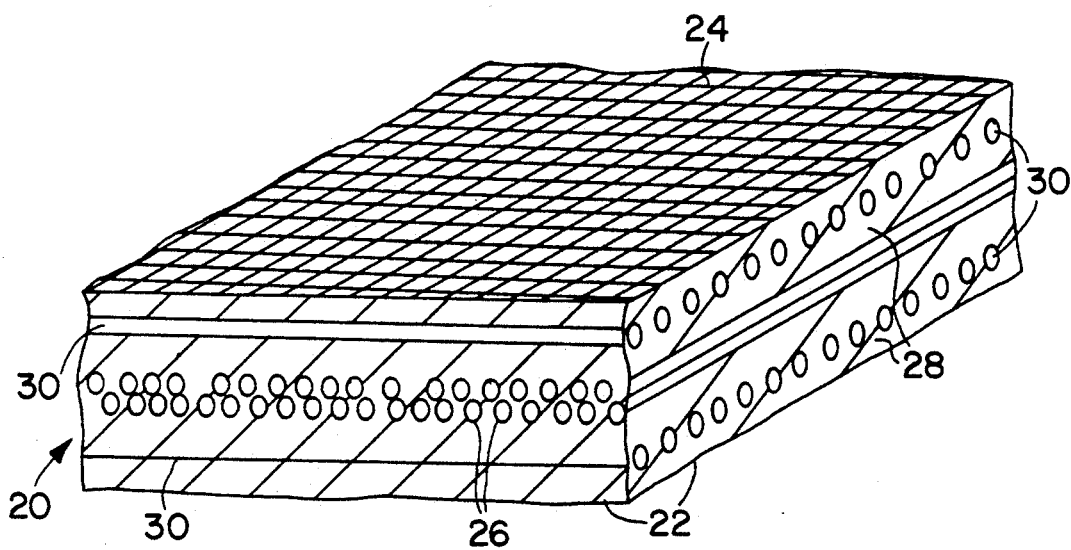
FIG. 2 shows the same type of view as in FIG. 1, but for a different construction of the clay building board.

FIG. 2 shows a thicker clay building board about 40 mm thick. In this case, a closed layer 26 made of reeds is embedded centrally in the core layer 20. The layer is about two reeds thick. The reeds are arranged so close alongside each other that the clay material 28 on one side of this layer 26 has no contact with the clay material 28 on the other side. In contrast to the embodiment shown in FIG. 1, this interrupts the capillarity of the clay building board. The clay 28 is reinforced by natural fibers. Between the central layer 26 and the two surfaces of the clay building board, there are two additional layers 30 of reeds arranged with some separation from each other. Each of these layers 30 has the thickness of one reed. In this case, therefore, the individual reeds are completely embedded in clay 28, so that the two layers 30 do not interrupt the capillarity. The two layers 30 run transversely to the layer 24.

Figure 3:
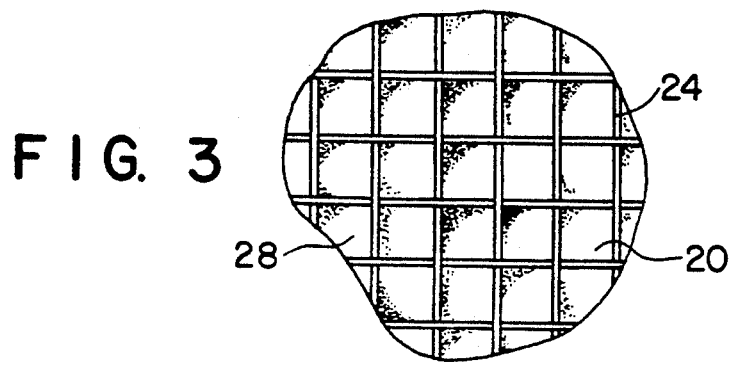
FIG. 3 shows a top view of a partial region of a surface of a clay building board according to FIG. 1 or FIG. 2.

FIG. 3 shows how the textile layer 22 is embedded in the surface of the clay building board. The joining together of the textile layer 22 and the core layer 20 is accomplished by this embedding. The textile layer 22 imparts its tensile strength to the clay building board, while the clay material retains its compressive strength. FIG. 3 shows that at least about one third of all threads in layer 22 are completely surrounded by clay, even if it is only an extremely thin layer of clay.

Figure 4:
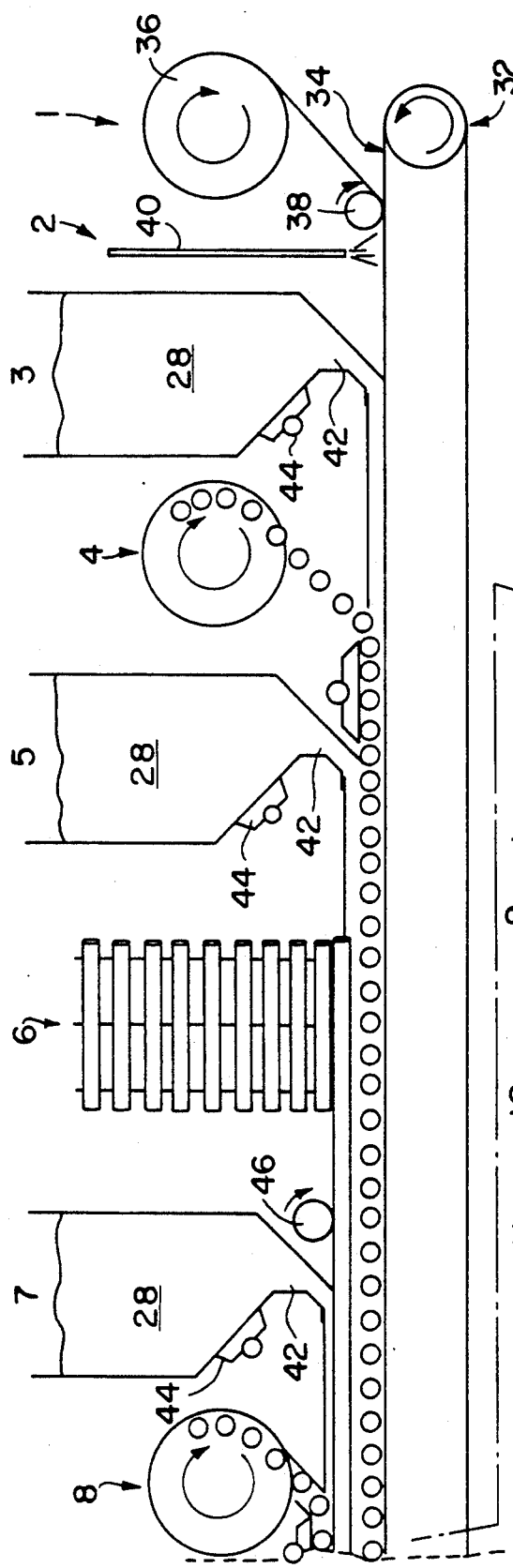
FIG. 4 is a schematic lateral representation of equipment for producing a clay building board similar to that shown in FIG. 2.
Figure 4:
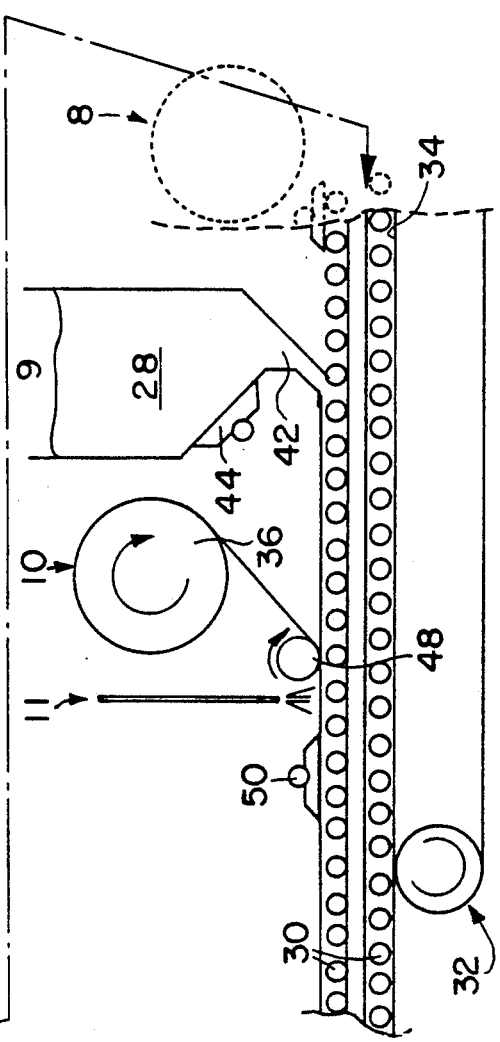

FIG. 4 shows one possibility for producing a clay building board with an arbitrary length and, for example, a width of two meters by the process of the invention. The clay building board is produced in steps or in layers on a conveyor belt 32 of sufficient width, specifically, on the top run 34, which is supported in such a way that it is flat and, in the example shown here (but not necessarily), horizontal. The direction of conveyance in the drawing is from right to left, as is also indicated by arrows on the guide roller and the drive roller of the conveyor belt 32.

In the first station, jute fabric H 155 is drawn from a roll 36. The rotation arrow shows the direction of removal. The drawing is effected by a roller 38 that presses against the top run 34. The top run drives the roller 38, but the roller 38 can also be driven itself. The roller also presses the jute fabric onto the surface of the top run 34. The jute fabric forms the layer 22 in the end product. In the immediately following station 40, the jute fabric is wetted with water over its entire width; in the example shown here, the water is sprayed onto the fabric. This station is not absolutely necessary, but the wetting of the jute results in a better bond with the clay.

In a third station, a clay-fiber mixture, which is plastic, is applied to the layer 22 by an oblong, wedge-shaped funnel 42. This application process is assisted by a vibrator 44. Instead of the vibrator or in addition to the vibrator, the funnel 42 can also be provided with a suitable conveyor roller, for example, a toothed roller. The funnel 42 runs slightly obliquely in the direction of conveyance of the conveyor belt 32. At its upper end, it is connected to a holding container for the plastic clay-fiber mixture. This holding container is continuously or discontinuously filled with clay-fiber mixture that is ready for use. The mixture can be prepared immediately above the holding container.

The layer 22 of textile material with a uniformly thick layer of the clay-fiber mixture is now located on the top run 34. Due to its weight, this layer of clay-fiber mixture presses into the textile layer 22 and at least partially envelops its threads.

In a fourth station, a one-layer reed mat made, for example, from seventy-stalk reed is applied to the clay layer. The direction of drawing is shown. As the figure shows, the reeds are separated from one another, so that in the finished product they are individually surrounded by clay. As the figure shows, the stalk direction runs transversely to the direction of conveyance of the conveyor belt 32. The reed layer is pressed into the clay layer by a vibrator 44, and the material is compacted at the same time.

In a fifth station, which is designed identically to the third station, a clay-fiber mixture in plastic form is again applied in a layer of equal thickness. The reference numbers are chosen the same as for the third station.

After the fifth station, a layer of clay-fiber mixture has thus been applied to the reed layer, which forms layer 30 in the finished produce, which meets the requirement that each individual stalk of the reed can be completely embedded in clay.

In a sixth station, reed is again applied to the product, but this time the stalk direction runs parallel to the direction of the conveyor belt 32. In this case, therefore, it is no longer possible to work continuously, but rather two-meter-long layers of the seventy-stalk reed are cut off and laid side by side on the clay layer of the fifth station, preferably with slight overlapping in the direction of the conveyor belt 32.

The reed is pressed into the surface of the clay paste by a vibrator in the form of a vibrating roller 46, which turns in the direction indicated by the accompanying arrow. Compacting is simultaneously achieved.

In a seventh station, which also has the same design as the third station, a layer of plastic clay-fiber mixture is again applied; the reader is referred to the description of the third station.

In an eighth station, which has the same design as the fourth station, seventy-stalk reed is again applied, with the stalk direction transverse to the direction of the conveyor belt 32. Since the same component parts are used, the same reference numbers are also used. The layer of reed applied in this way forms layer 30 in the finished clay building board.

In a ninth station, which has the same design as the third station, a layer of plastic clay-fiber mixture is again applied to the layered product. Since the same component parts are used, the same reference numbers are also used.

In the tenth and eleventh stations, which have the same design as the first and second stations, jute H 155 in fabric form is drawn from a roll and pressed into the surface of the clay layer by a take-up roller 48 in the example shown here. It is also possible (but not necessary) to use a vibrator 50 for this purpose. The vibrator 50 can also be designed as a rotating roller; in this case, a higher rotational speed is advisable, which causes the clay to be worked into the jute. Due to the higher rotational speed, the roller slides over the jute material. Wetting is also performed.

The end product is a clay building board, which is basically the same as the board shown in FIG. 2, with the exception that the middle layer of reed is designed the same as the two outer layers 30. Thus, in contrast to the embodiment of the invention shown in FIG. 2, the clay building board has regions in which the clay material extends all the way through the board from one surface to the other, thereby ensuring capillarity.

Other embodiments of equipment for producing clay building boards in accordance with the invention are also conceivable. Instead of applying a plastic (wet) clay-fiber mixture, it is also possible to fill the reservoir container above the funnel 42 with a dry clay-fiber mixture and to apply this mixture in layers on the top run 34. Directly at the outlet of the funnel or below the outlet, there are spray nozzles, which feed water into the dry stream and which cause sufficient mixing of water and dry material, as in the dry-spray concrete process, that finally a sufficiently plastic layer of clay is present on the top run 34.

The conveyor belt is preferably porous, so that excess water is removed by passing down through the conveyor belt and in any case does not back up. The clay building board can be used as permanent formwork for tamped clay walls etc.

The textile material is preferably made of pumpable, i.e., fibrous, threads. In contrast to monofilamentary threads (which, however, are not excluded here), it offers a greater surface for the adhesion of the clay paste and thus the bond between the textile material and the core layer.

The textile material can also be a sheet of paper or cardboard provided with many holed. The holes, which account for at least one third of the surface area of the layer, allow the clay paste to pass through, so that a very secure bond is formed.

The textile material is much thinner than the core layer. Its thickness is at most 1/10 the thickness of the core layer. The thickness of the textile material is typically between 0.5 and 4 mm.

The boards can be equipped on two adjoining narrow surfaces with grooves and on the other two narrow surfaces with tongues.

I claim:

1. A clay building board comprising a clay-bound core layer which contains clay as a binder with surface layers on both sides, wherein each surface layer has a netlike, tear-resistant, textile material made from natural fibrous threads, wherein the textile material is partially embedded in the clay of the clay-bound core layer, and wherein a diameter of the threads of the textile material is smaller than a free space between two neighboring threads by a factor of at least five.

2. The clay building board in accordance with claim 1, wherein the clay-bound core layer further contains reinforcing material selected from the group consisting of threads of natural material and stalks of natural material.

3. The clay building board in accordance with claim 1, wherein the textile material is a coarse-meshed fabric.

4. The clay building board in accordance with claim 1, wherein openings in the netlike textile material are at least ten times larger than the diameter of the threads of which the netlike textile material is made.

5. The clay building board in accordance with claim 1, wherein the clay-bound core layer contains clay selected from the group consisting of light clay and clay with porous mineral additives.

6. The clay building board in accordance with claim 1, wherein at least one third of all threads of the surface layers are completely surrounded by clay.

7. The clay building board in accordance with claim 1, further comprising an inner insulation layer made from reeds, which is embedded in the clay-bound core layer and arranged side by side without intervening spaces so that capillarity of the clay building board is interrupted.

8. The clay building board in accordance with claim 1, wherein the clay material of the clay-bound core layer extends continuously all the way through the board from one surface to the other, at least in some regions of the clay building board, so that in these regions capillarity of the clay building board is maintained.

9. A process for producing a clay building board in accordance with claim 1 comprising the steps of producing a clay-bound core layer which contains clay as a binder of a predetermined, uniform thickness from wet clay, and applying a surface layer of a netlike, tear-resistant, textile material made from natural fibrous threads to and pressing into each of two still-wet surfaces of the clay-bound core layer.

10. The process in accordance with claim 9, wherein the clay building board is produced by layering each layer on a continuously running conveyor belt.

11. The process in accordance with claim 10, wherein the clay-bound core layer further contains reinforcing fibers, thereby forming a clay-fiber mixture and the clay-fiber mixture is applied layer by layer on the conveyor belt by a funnel.

12. The process in accordance with claim 9, wherein at least one of vibrators rollers are used to compact and smooth the layers during at least one of intermediate stages of the layer construction and in a finished stage, on a still wet surface of the clay building board.

13. The clay building board in accordance with claim 2, wherein the reinforcing material comprises reed.

14. The clay building board in accordance with claim 5, wherein the light clay is straw light clay.

15. The clay building board in accordance with claim 5, wherein the clay with porous mineral additives is selected from the group consisting of expanded clay, expanded glass, expanded lava, expanded perlite and pumice.

16. The clay building board in accordance with claim 7, wherein the insulation layer is made from at least a double layer of reeds.

17. The process in accordance with claim 9, further comprising the step of applying an insulation layer made from reed into the clay-bound core layer.

* * * * *